(12) United States Patent
Hu

(10) Patent No.: US 11,892,645 B2
(45) Date of Patent: Feb. 6, 2024

(54) INTELLIGENT VR ELASTIC BANDAGE EQUIPMENT

(71) Applicant: ETLINK (HK) PRECISION INDUSTRIAL CO., LIMITED, Shenzhen (CN)

(72) Inventor: Yongqiang Hu, Shenzhen (CN)

(73) Assignee: ETLINK (HK) PRECISION INDUSTRIAL CO., LIMITED, Shenzhen (CN)

( * ) Notice: Subject to any disclaimer, the term of this patent is extended or adjusted under 35 U.S.C. 154(b) by 371 days.

(21) Appl. No.: 17/394,432

(22) Filed: Aug. 5, 2021

(65) Prior Publication Data

US 2022/0413303 A1 Dec. 29, 2022

(30) Foreign Application Priority Data

Jun. 24, 2021 (CN) .......................... 202110707363.9

(51) Int. Cl.
| | |
|---|---|
| *G06F 1/16* | (2006.01) |
| *H05K 5/00* | (2006.01) |
| *H05K 7/00* | (2006.01) |
| *G02B 27/01* | (2006.01) |
| *A42B 3/14* | (2006.01) |
| *A42B 3/22* | (2006.01) |
| *G06F 3/041* | (2006.01) |

(52) U.S. Cl.
CPC .......... *G02B 27/0176* (2013.01); *A42B 3/145* (2013.01); *A42B 3/224* (2013.01); *G06F 3/0412* (2013.01)

(58) Field of Classification Search
CPC .............. G06F 3/0412; G02B 27/0176; G02B 27/0172; G02B 27/0179; G02B 27/0149; G02B 27/0159; G02B 27/054; G02B 27/017; G02B 2027/0178; A42B 3/145; A42B 3/224
See application file for complete search history.

(56) References Cited

U.S. PATENT DOCUMENTS

| | | | | |
|---|---|---|---|---|
| 5,276,471 A | * | 1/1994 | Yamauchi .............. | G02C 7/101 351/158 |
| 6,333,814 B1 | * | 12/2001 | Chang ...................... | G02C 7/08 351/158 |
| 8,896,992 B2 | * | 11/2014 | Sherlock ................. | G06F 1/163 361/679.16 |
| 9,423,842 B2 | * | 8/2016 | Osterhout .......... | H05K 7/20409 |

(Continued)

*Primary Examiner* — Anthony M Haughton
(74) *Attorney, Agent, or Firm* — Georgi Korobanov

(57) ABSTRACT

Intelligent VR (Virtual Reality) elastic bandage equipment includes a main body, left and right supporting arms, a rear support, a telescopic assembly and a driving mechanism. According to a touch panel in the equipment, different input signals are triggered through different touch actions and touch durations, and a motor is controlled through a main control circuit board, so that the motor outputs different rotating speeds and directions; and therefore, the motor further drives the driving mechanism to drive the telescopic assembly to move and stretch, the telescopic assembly further drives the left and right supporting arms to retract, and adjustment of the distance between the main body and the head of a human body is achieved, so that the equipment is more comfortable to use, the use range is enlarged, and the operation is easy.

7 Claims, 1 Drawing Sheet

(56) References Cited

U.S. PATENT DOCUMENTS

| | | | | |
|---|---|---|---|---|
| 9,585,285 B2* | 2/2017 | Nikkhoo | ................... | F28F 3/08 |
| 9,989,998 B1* | 6/2018 | Yee | ................... | G02B 27/0176 |
| 10,863,637 B1* | 12/2020 | Pickett | ................ | H05K 5/0204 |
| 2016/0341967 A1* | 11/2016 | Kaji | ................... | G02B 27/0179 |
| 2018/0095497 A1* | 4/2018 | Hsu | .......................... | A61F 9/06 |

* cited by examiner

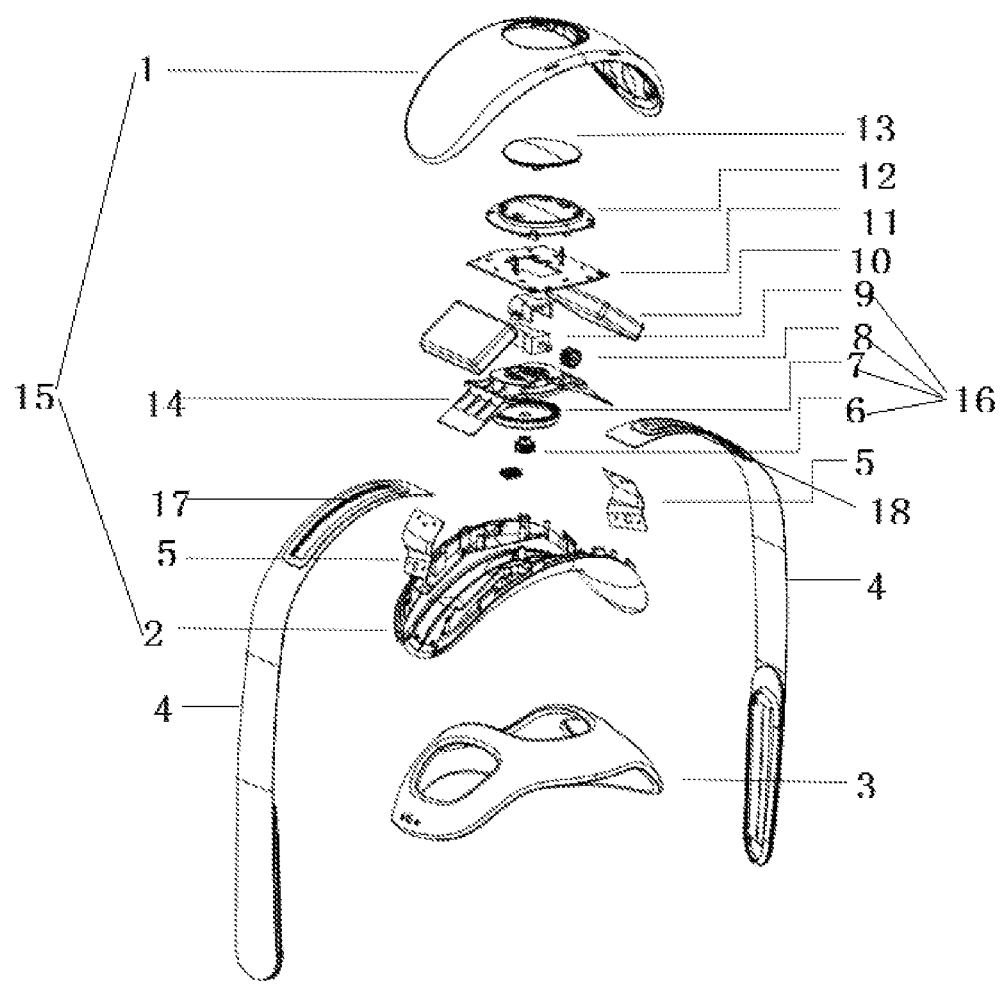

INTELLIGENT VR ELASTIC BANDAGE EQUIPMENT

CROSS REFERENCE TO THE RELATED APPLICATIONS

This application is based upon and claims priority to Chinese Patent Application No. 202110707363.9, filed on Jun. 24, 2021, the entire contents of which are incorporated herein by reference.

TECHNICAL FIELD

The present disclosure relates to the technical field of head-mounted equipment, in particular to intelligent VR (Virtual Reality) elastic bandage equipment.

BACKGROUND

VR is virtual reality technology, and a VR head-mounted display uses a head-mounted display to close the visual sense and auditory sense of people to the outside, so as to guide a user to generate a feeling that the user is in a virtual environment. With the continuous development of society, the virtual reality technology is gradually matured, is widely applied, and is related to military and aerospace fields, game industries and the like.

At present, most bandage products applied to VR head-mounted equipment in the market are manually tightened and loosened and are inconvenient to operate, and the user needs to apply certain pressure or manually rotate a knob to fix or loosen the head-mounted equipment in the using process.

SUMMARY

The purpose of the present disclosure is to provide intelligent VR (Virtual Reality) elastic bandage equipment so as to solve the problem proposed in the background technology.

In order to achieve the above purpose, the present disclosure provides the following technical scheme:

The intelligent VR elastic bandage equipment comprises a main body, left and right supporting arms and a rear support, and the equipment also comprises:
- a telescopic assembly, being arranged on the left and right supporting arms and used for stretching the left and right supporting arms; and
- a driving mechanism, being arranged in the main body and used for stretching the telescopic assembly; and
- the telescopic assembly is driven to move and stretch through the driving mechanism, the telescopic assembly further drives the left and right supporting arms to retract, and adjustment of the distance between the main body and the head of a human body is achieved.

As further scheme of the present discourse, the driving mechanism comprises:
- a transmission assembly, being connected with the telescopic assembly and used for driving the telescopic assembly to move; and
- a power part, being connected with the transmission assembly and arranged in the main body, and providing power for the transmission assembly.

As further scheme of the present disclosure, the main body comprises a cavity formed by clamping a front cover and a rear cover through a buckle, the cavity comprises a driving mechanism, a battery, an integrated circuit board, a light guide plate, a supporting frame and a touch panel, the power part is a motor, the motor is fixedly arranged on the supporting frame in the main body, the transmission assembly comprises a motor gear, the motor gear is fixedly installed at the output end of the motor, a first transmission gear and a second transmission gear are arranged between the supporting frame and the rear cover and fixedly arranged on the same supporting shaft, the first transmission gear is meshed with the motor gear, and the second transmission gear is connected with the telescopic assembly.

As further scheme of the present disclosure, the telescopic assembly comprises a rack assembly, the rack assembly comprises a first rack and a second rack, the first rack and the second rack are fixedly arranged on the left and right supporting arms respectively, and left and right telescopic arms are meshed with the second transmission gear through the first rack and the second rack in a high-low stacking mode.

As further scheme of the present disclosure, the touch panel is arranged on the front cover, different input signals are triggered through different touch actions and touch durations, the motor is controlled through a main control circuit board so that the motor outputs different rotating speeds and directions, and a main control circuit on the main control circuit board is an integrated control circuit integrating functional devices such as an MCU (Microprogrammed Control Unit), a buzzer and an LED (Light-Emitting Diode).

As further scheme of the present disclosure, the light guide plate is fixed on the main control circuit board, and a light guide column corresponds to the position of the LED on the main control circuit board; and a touch induction copper foil is installed on the inner side of the touch panel and connected to a wire, the wire penetrates through a hole groove in the light guide plate to be connected to the main control circuit board, and the touch panel and the light guide plate are clamped together through a clamping hook.

As further scheme of the present disclosure, the rear support is connected with one end of each of supporting plates, and the other ends of the connecting plates are connected to the rear cover.

Compared with the prior art, the intelligent VR elastic bandage equipment has the beneficial effects that the practicability is high, the touch panel triggers different input signals through different touch actions and touch durations, and the motor is controlled through the main control circuit board, so that the motor outputs different rotating speeds and directions; and therefore, the motor further drives the driving mechanism to drive the telescopic assembly to move and stretch, the telescopic assembly further drives the left and right supporting arms to retract, and adjustment of the distance between the main body and the head of the human body is achieved, so that the equipment is more comfortable to use, the use range is enlarged, and the operation is easy.

BRIEF DESCRIPTION OF THE DRAWINGS

FIGURE is an explosive view of intelligent VR (Virtual Reality) elastic bandage equipment.

Reference signs in attached FIGURES: 1, front cover; 2, rear cover; 3, rear support; 4, left and right supporting arms; 5, connecting plate; 6, second transmission gear; 7, first transmission gear; 8, motor gear; 9, motor; 10, battery; 11, main control circuit board; 12, light guide plate; 13, touch panel; 14, supporting frame; 15, main body; 16, driving mechanism; 17, first rack; and 18, second rack.

DETAILED DESCRIPTION OF THE EMBODIMENTS

The following embodiments describe the present disclosure in detail with reference to the attached figures, in the attached FIGURES or the description, similar or same parts use the same reference signs, and the shape, thickness or height of various components may be expanded or reduced in practical application. The illustrated embodiments of the present disclosure are merely illustrative of the present disclosure and are not intended to limit the scope of the present disclosure. Any obvious modifications or alterations made to the present disclosure do not depart from the spirit and scope of the present disclosure.

In the embodiment of the present disclosure, intelligent VR (Virtual Reality) elastic bandage equipment comprises a main body 15, left and right supporting arms 4 and a rear support 3, and the equipment also comprises:
  a telescopic assembly, being arranged on the left and right supporting arms 4 and used for stretching the left and right supporting arms 4; and
  a driving mechanism 16, being arranged in the main body 15 and used for stretching the telescopic assembly; and
  the telescopic assembly is driven to move and stretch through the driving mechanism 16, the telescopic assembly further drives the left and right supporting arms 4 to retract, and adjustment of the distance between the main body 15 and the head of a human body is achieved.

As an embodiment of the present disclosure, referring to FIGURE, the driving mechanism 16 comprises:
  a transmission assembly, being connected with the telescopic assembly and used for driving the telescopic assembly to move; and
  a power part, being connected with the transmission assembly and arranged in the main body 15, and providing power for the transmission assembly.

The transmission assembly is driven by the power part for transmission, and the transmission assembly further drives the telescopic assembly to stretch or loosen.

As an embodiment of the present disclosure, referring to FIGURE, the main body 15 comprises a cavity formed by clamping a front cover 1 and a rear cover 2 through a buckle, the cavity comprises a driving mechanism 16, a battery 10, an integrated circuit board, a light guide plate 12, a supporting frame 14 and a touch panel 13, the power part is a motor 9, the motor 9 is fixedly arranged on the supporting frame 14 in the main body 15, the transmission assembly comprises a motor gear 8, the motor gear 8 is fixedly installed at the output end of the motor 9, a first transmission gear 7 and a second transmission gear 6 are arranged between the supporting frame 14 and the rear cover 2 and fixedly arranged on the same supporting shaft, the supporting shaft is not shown in the FIGURE, the first transmission gear 7 is meshed with the motor gear 8, and the second transmission gear 6 is connected with the telescopic assembly.

The motor gear 8 is driven by the motor 9 to rotate, the first transmission gear 7 can be driven to rotate through meshing between the motor gear 8 and the first transmission gear 7, the first transmission gear 7 further drives the second transmission gear 6 to rotate, and the telescopic assembly is driven by the second transmission gear 6 to stretch.

As an embodiment of the present disclosure, referring to FIGURE, the telescopic assembly comprises a rack assembly, the rack assembly comprises a first rack 17 and a second rack 18, the first rack 17 and the second rack 18 are fixedly arranged on the left and right supporting arms 4 respectively, and left and right telescopic arms are meshed with the second transmission gear 6 through the first rack 17 and the second rack 18 in a high-low stacking mode.

Through meshing between the second transmission gear 6 and the first rack 17 and between the second transmission gear 6 and the second rack 18, the first rack 17 and the second rack 18 can be further driven to move oppositely and reversely, so that the left and right telescopic arms are further driven to stretch.

As an embodiment of the present disclosure, referring to FIGURE, the touch panel 13 is arranged on the front cover 1, different input signals are triggered through different touch actions and touch durations, the motor 9 is controlled through a main control circuit board 11 so that the motor 9 outputs different rotating speeds and directions, and a main control circuit on the main control circuit board 11 is an integrated control circuit integrating functional devices such as an MCU (Microprogrammed Control Unit), a buzzer and an LED (Light-Emitting Diode).

When a user touches the touch panel 13 through the first action, the motor 9 rotates at a constant speed in the forward direction, the left and right telescopic arms are driven to move towards the inner side through a gear and rack transmission structure, and therefore the distance between VR head-mounted equipment and the head of the human body is shortened.

When the user stops touching the touch panel 13, the motor 9 stops moving, at the moment, the user touches the touch panel 13 through the second action, and the motor 9 performs forward single-step movement, so that single-step fine adjustment retraction of the distance between the VR head-mounted equipment and the head of the human body is achieved.

When the user touches the touch panel 13 through the third action, the motor 9 rotates at a constant speed in the reverse direction, the left and right telescopic arms are driven to move towards the outer side through the gear and rack transmission structure, and therefore the distance between VR head-mounted equipment and the head of the human body is extended.

When the user stops touching the touch panel 13, the motor 9 stops moving, at the moment, the user touches the touch panel 13 through the fourth action, and the motor 9 performs reverse single-step movement, so that single-step fine adjustment extension of the distance between the VR head-mounted equipment and the head of the human body is achieved.

As an embodiment of the present disclosure, referring to FIGURE, the light guide plate is fixed on the main control circuit board, and a light guide column corresponds to the position of the LED on the main control circuit board 11; and a touch induction copper foil is installed on the inner side of the touch panel 13 and connected to a wire, the wire penetrates through a hole groove in the light guide plate to be connected to the main control circuit board 11, and the touch panel 13 and the light guide plate are clamped together through a clamping hook.

When the user touches the touch panel 13 of the product, the copper foil assembled on the inner side of the touch panel 13 transmits touch induction to a touch induction chip for recognition, the touch induction chip outputs recognized actions to the MCU in different electric signals for processing, and the MCU makes corresponding judgment and control according to a written software protocol, and forward rotation, reverse rotation, continuous rotation or single-step rotation of the motor 9 is achieved. The principle of touch control is basically the same as that of a TWS earphone.

As an embodiment of the present disclosure, referring to FIGURE, the rear support 3 is connected with one end of each of supporting plates 5, and the other ends of the connecting plates 5 are connected to the rear cover 2.

The working principle is as follows: when the user touches the touch panel 13 of the product, the copper foil assembled on the inner side of the touch panel 13 transmits touch induction to the touch induction chip for recognition, the touch induction chip outputs recognized actions to the MCU in different electric signals for processing, and the MCU makes corresponding judgment and control according to a written software protocol, and forward rotation, reverse rotation, continuous rotation or single-step rotation of the motor 9 is achieved; when the motor 9 rotates, the motor gear 8 is driven by the motor 9 to rotate, the first transmission gear 7 can be driven to rotate through meshing between the motor gear 8 and the first transmission gear 7, the first transmission gear 7 further drives the second transmission gear 6 to rotate, and through meshing between the second transmission gear 6 and the first rack 17 and between the second transmission gear 6 and the second rack 18, the first rack 17 and the second rack 18 can be further driven to move oppositely and reversely, and therefore the left and right telescopic arms are further driven to retract. When the battery 10 is low in electric quantity, the buzzer gives an alarm to prompt low electric quantity; and as the amount of electricity changes, the LED lamp achieves different colors.

For those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. The appended drawing reference signs in the claims shall not be regarded to limit the involved claims.

Further, it should be understood that although the present specification is described with reference to embodiments, not each embodiment contains only one independent technical scheme. The specification is so described just for clarity. Those skilled in the art should regard the specification as a whole, and technical schemes of various embodiments can be combined appropriately to form other implementations which can be understood by those skilled in the art.

What is claimed is:

1. Intelligent VR (virtual reality) elastic bandage equipment, comprising
    a main body,
    left and right supporting arms,
    a rear support,
    a telescopic assembly, and
    a driving mechanism, wherein
        the telescopic assembly is arranged on the left and right supporting arms, and the telescopic assembly is used for stretching the left and right supporting arms; and
        the driving mechanism is arranged in the main body, and the driving mechanism is used for stretching the telescopic assembly; and
        the telescopic assembly is driven to move and stretch through the driving mechanism,
        the telescopic assembly further drives the left and right supporting arms to retract to adjust a distance between the main body and a head of a human body.

2. The intelligent VR elastic bandage equipment according to claim 1, wherein
    the driving mechanism comprises:
    a transmission assembly, wherein the transmission assembly is connected with the telescopic assembly and used for driving the telescopic assembly to move; and
    a power part, wherein the power part is connected with the transmission assembly and arranged in the main body to provide power for the transmission assembly.

3. The intelligent VR elastic bandage equipment according to claim 2, wherein
    the main body comprises a cavity formed by clamping a front cover and a rear cover through a buckle,
        the cavity comprises a driving mechanism, a battery, an integrated circuit board, a light guide plate, a supporting frame and a touch panel,
    the power part is a motor,
        the motor is fixedly arranged on the supporting frame in the main body,
    the transmission assembly comprises a motor gear,
        the motor gear is fixedly installed at an output end of the motor,
    a first transmission gear and a second transmission gear are arranged between the supporting frame and the rear cover,
    the first transmission gear and the second transmission gear are fixedly arranged on a same supporting shaft,
    the first transmission gear is meshed with the motor gear, and
    the second transmission gear is connected with the telescopic assembly.

4. The intelligent VR elastic bandage equipment according to claim 3, wherein
    the telescopic assembly comprises a rack assembly,
    the rack assembly comprises a first rack and a second rack,
        the first rack and the second rack are fixedly arranged on the left and right supporting arms respectively, and
        left and right telescopic arms are meshed with the second transmission gear through the first rack and the second rack in a high-low stacking mode.

5. The intelligent VR elastic bandage equipment according to claim 4, wherein
    the touch panel is arranged on the front cover,
    different input signals are triggered through different touch actions and touch durations,
    the motor is controlled through a main control circuit board to output different rotating speeds and directions, and
    a main control circuit on the main control circuit board is an integrated control circuit integrating functional devices comprising a microprogrammed control unit (MCU), a buzzer and a light-emitting diode (LED).

6. The intelligent VR elastic bandage equipment according to claim 5, wherein
    the light guide plate is fixed on the main control circuit board, and a light guide column corresponds to a position of the LED on the main control circuit board; and a touch induction copper foil is installed on an inner side of the touch panel, and the touch induction copper foil is connected to a wire, the wire penetrates through a hole groove in the light guide plate to be connected to the main control circuit board, and the touch panel and the light guide plate are clamped together through a clamping hook.

7. The intelligent VR elastic bandage equipment according to claim 1, wherein the rear support is connected with first ends of supporting plates, and second ends of the connecting plates are connected to the rear cover.

* * * * *